United States Patent [19]

Mouille

[11] 3,920,202

[45] Nov. 18, 1975

[54] SUSPENSION SYSTEM FOR ROTOCRAFT ROTORS

[75] Inventor: René Louis Mouille, Aix-en-Provence, France

[73] Assignee: Societe Nationale Industrielle Aerospatiale, Paris, France

[22] Filed: Apr. 25, 1974

[21] Appl. No.: 464,032

[30] Foreign Application Priority Data

May 8, 1973 France .............................. 73.16475

[52] U.S. Cl. .......... 244/17.27; 188/113; 248/358 R; 416/134; 416/500
[51] Int. Cl.² ........................................ B63C 27/00
[58] Field of Search ........... 244/17.27, 17.11, 17.25; 248/5, 15, 358 R; 188/1 B; 416/134, 500

[56] References Cited
UNITED STATES PATENTS

| 1,493,066 | 5/1924 | Caldwell et al. | 416/134 |
| 2,333,166 | 11/1943 | Fraser | 416/134 |
| 2,363,469 | 11/1944 | Goldschmidt | 416/134 |
| 3,073,557 | 1/1963 | Davis | 248/358 X |
| 3,271,188 | 9/1966 | Albert et al. | 188/1 B X |
| 3,399,103 | 8/1968 | Salyer et al. | 188/1 B X |
| 3,493,221 | 2/1970 | Mozdzanowski | 248/358 X |
| 3,502,290 | 3/1970 | LeGrand et al. | 244/17.27 X |

Primary Examiner—Trygve M. Blix
Assistant Examiner—Barry L. Kelmachter
Attorney, Agent, or Firm—Murray Schaffer

[57] ABSTRACT

The vibration created by torque of a rotor of a helicopter and the like is dampened by fastening a baseplate having a pair of diametrically opposed shoulders to the housing of the transmission box whereto the rotor mast is mounted. Relatively to the fuselage of the helicopter, projections are fixed which are independent of the baseplate and extend in opposition to the shoulders to cooperate therewith for limiting the rotary movement of the baseplate. Between the shoulders and the projections, resilient members are interposed to absorb the compressive force of the rotary movement.

9 Claims, 3 Drawing Figures

SUSPENSION SYSTEM FOR ROTOCRAFT ROTORS

BACKGROUND OF THE INVENTION

The present invention relates to a suspension system for the rotor of a helicopter and particularly to a system positioned between the bottom of the main transmission box and the top of the fuselage of a helicopter, capable of filtering out movements and vibration between the main rotor and the fuselage of the helicopter, occurring when the helicopter is used.

On such aircraft, movement and vibration is a difficult problem to overcome satisfactorily. Endeavours have been made to alleviate it by providing the rotor blades or the drive members with pendular resonators tuned to the frequency to be filtered out. Other techniques involve the use of flexible members positioned along oblique bars interconnecting the top of the main transmission box and structural parts of the fuselage.

Among the known systems for reducing vibration, there is disclosed in French Pat. No. 1,507,306, corresponding to U.S. Pat. No. 3,502,290, the provision of an elastic link between the main rotor of a helicopter and the structural members of its fuselage. The link consists essentially of a baseplate to which the bottom of the main transmission box housing (to which the rotor mast is mounted) is secured by a circle of bolts. The baseplate is provided with lateral extensions which enable it to be secured to the fuselage structure. The baseplate is subjected only to forces and torques in its own plane by reason of the fact that the top of the main transmission box is restrained by a set of inclined bars forming a pyramid-like arrangement which secures the transmission box fast with load-bearing points on the fuselage. The point of convergence of these bars is the apex of the pyramid, which forms the center of rotation for the main transmission box housing.

The baseplate of this known construction consists of a flat plate having cutout portions, after the fashion of a grid, forming elongated bars which provide, by their flexing, the elasticity required to filter out vibration in the fore-aft axis of the helicopter or in a direction perpendicular thereto and, by their rigidity in tension and compression, the ability to also transmit to the fuselage the driving torque applied to the main transmission box housing, which torque is high in the case of helicopters.

The known baseplate is easy to manufacture and inexpensive provided that flexibility is required only along one axis. On the other hand, if the required flexibility must conversely be available along several axes and specifically along two mutually perpendicular axes, it is imperative to provide at least two grids interconnected by rigid members. This complicates the design of the mechanism and makes it markedly more costly to manufacture than a mono-directionally acting baseplate. This is due to the fact that the material used for fabricating the baseplate (which must provide both a degree of flexural resilience and the necessary rigidity in tension and compression and which must also be light enough to avoid a weight penalty) is a titanium alloy which is more costly and more expensive to machine than an aluminum alloy or steel.

The present invention has as its object the provision of a rotor suspension system which overcomes the disadvantages of the known systems, and which provides a simple economical means for suspending rotors in all types of rotor aircrafts.

It is another object of the present invention to provide a suspension system for the rotor of a helicopter securing a flexible relationship between the rotor and the helicopter fuselage, yielding to pressures affecting the rotor from different directions in a plane and absorbing the torque produced by the drive.

Yet another object of the present invention is to provide a rotor suspension system for placement between the main rotor and fuselage of a helicopter, consisting of an inexpensive and easy-to-fabricate baseplate capable of providing mono- or multi-directional flexibility in its plane and of absorbing the torque produced by the main transmission box.

SUMMARY OF THE INVENTION

In the suspension system according to the invention, a baseplate having a pair of shoulders radially extending in opposed directions is fastened to the housing of the transmission box. Structural members on top of the helicopter fuselage have fixed relatively thereto radial projections independent of said baseplate and extending in opposition to said shoulders to cooperate therewith for limiting rotary movement of said baseplate. For absorbing the compressive force of said movement, resilient means are interposed between said shoulders and said projections. For securing cooperation of, and engagement between, said projections and said shoulders, there may be interprosed between said baseplate and said projections an annular member having extensions protruding therefrom in opposition to said shoulders and said projections and abutting on same across said resilient means.

The description which follows with reference to the accompanying non-limitative exemplary drawings will give a clear understanding of how the invention can be carried into practice.

DESCRIPTION OF THE PREFERRED EMBODIMENTS OF THE INVENTION

Figure 1:
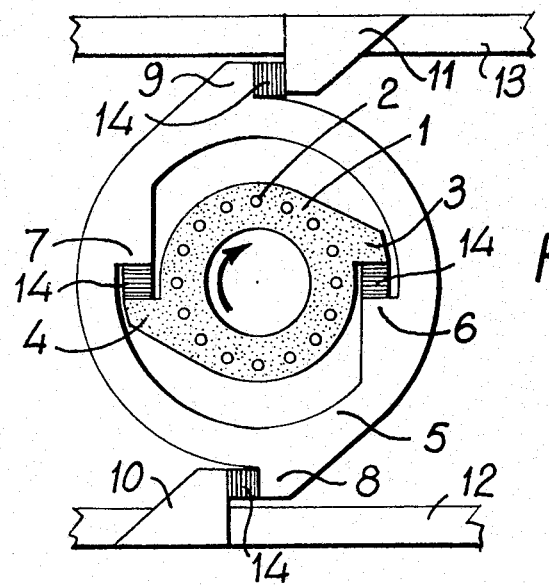
FIG. 1 is a diagrammatic plan view of a suspension system illustrating one embodiment of the subject system of the present invention capable of filtering out movements and vibration by providing flexibility in two mutually perpendicular directions.

As schematically shown in FIG. 1, the system comprises basicallly a baseplate 1 which is fixed by means of a circle of bolts 2 to the bottom of the conventional main transmission box housing (not shown) of the helicopter. The baseplate 1 is formed with two diametrically opposed outwardly extending shoulders 3 and 4, and is surrounded by a coplanar rigid ring 5 of generally annular shape which is formed with two radially extending internal extensions 6 and 7. The extensions 6 and 7 are positioned opposite the shoulders 3 and 4 so as to provide abutting members. The ring 5 is also provided with two radially protruding extensions 8 and 9 angularly offset by 90° from said internal extensions 6 and 7. The extensions 8 and 9 are adapted to abut against diametrically opposed fittings 10 and 11, respectively, which are fastened to elongated load bearing rail supporting members 12 and 13, secured to the fuselage of the helicopter. The internal extensions 6 and 7 and the external extensions 8 and 9 are preferably raised above the plane of the respective baseplate and ring so as to provide vertical abutment faces.

Between the shoulders 3 and 4 and the internal extensions 6 and 7 and between the external extensions 8 and 9 and two fittings 10 and 11, there are interposed generally rectangular laminated blocks 14 having a degree of transverse flexibility and great rigidity in compression. These blocks, which are well-known, consist basically of a stack of individual metal plates having a thin layer of an elastomer-like elastic material between the plates. The effect of transverse loads on such blocks is to cause relative slippage between the rigid individual elements of the block enabling the two outer faces of the block to deform with respect to each other by an amount equal to the sum of the individual slippages, whereas deformation of the stack in compression is virtually nil notwithstanding heavy axial loads. The blocks 14 may be secured to either or both of the opposed abutting members.

Figure 2:
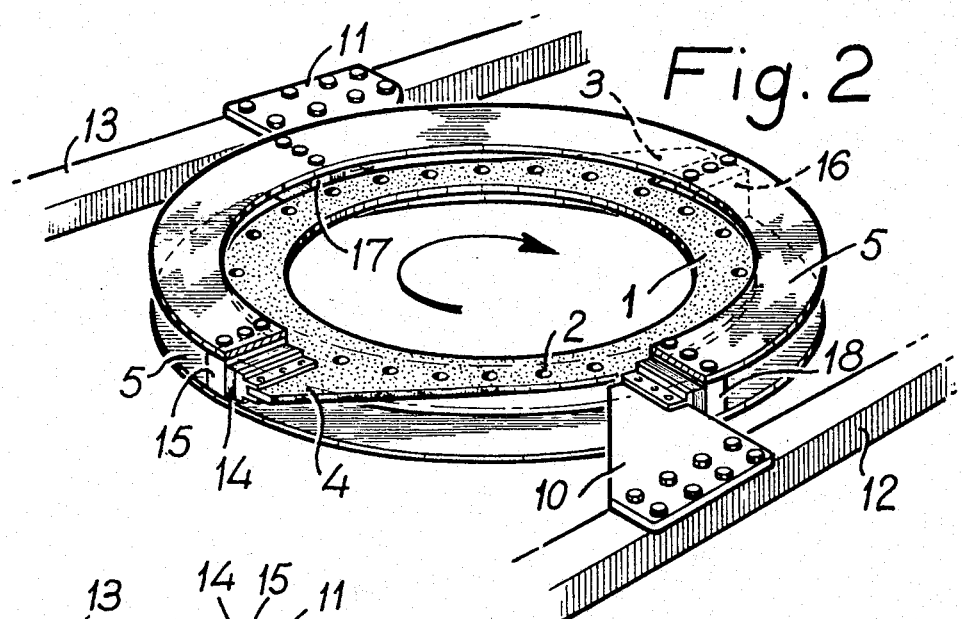
FIG. 2 is an enlarged perspective view of another embodiment of the subject system of the present invention.

In the specific embodiment shown in FIG. 2, the baseplate 1, which is a circular light-alloy ring, is formed with concentric holes 2 to which the bottom of the helicopter transmission box can be bolted. The baseplate is further formed with two diametrically opposed shoulders 3 and 4 to which are bolted the laminated blocks 14.

Around the baseplate 1 is concentrically positioned a rigid ring 5 consisting of two generally concentric metal flat annular members 5a and 5b made of a light metal and maintained in mutually parallel planes by means of four spacers 15, 16, 17, 18 bolted at uniform radial distances about the circumference of each of the annular members. The four spacers 15, 16, 17, 18 form the thrust points for absorbing the load forces created by the rotating rotor, two of the spacers 15 and 16 for each of the laminated blocks 14 secured to the shoulders 3 and 4 of the baseplate 1, while the other two spacers 17 and 18 form the trust points for the two other identical laminated blocks 14, angularly offset by 90° which are secured to the diametrically opposed fittings 10 and 11 bolted to the load-bearing frames 12 and 13 of the helicopter structure.

The assembly is so arranged that the driving torque transmitted by the bottom of the transmission gearbox to the baseplate 1 sets the four laminated blocks 14 at each of the thrust points 15 to 18 under compression before being transmitted by the fittings 10 and 11 to the load-bearing structure of the helicopter.

At the same time, alternating longitudinal and transverse loads are absorbed by each of the two opposed pairs of laminated blocks 14, which then operate in shear and permit oscillating or alternating motion of baseplate 1 parallel to the plane of the baseplate relative to ring 5, and of ring 5 relative to the structural members 12 and 13. Thus it will readily be appreciated that, overall, the subject system of this invention permits longitudinal and transverse displacements of the bottom of the transmission box relative to the helicopter structure, with a powerful elastic return effect, and at the same time transmission of the driving torque to the helicopter structure.

Figure 3:
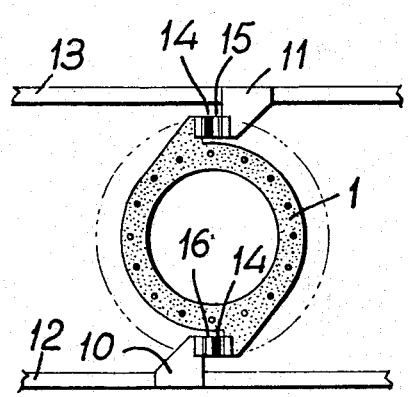
FIG. 3 is yet another view showing another embodiment of the subject system of the present invention.

Should filtering of the vibration require flexibility of interconnection in one direction only, then as shown in FIG. 3 it will suffice to retain only the baseplate 1 and to dispense with the ring 5. By positioning two fittings 15 and 16 and their associated blocks 14 directly on the fuselage frames through the fittings 10 and 11, and by causing the corresponding blocks attached to the extending baseplate shoulders 3 and 4 to directly abut thereon, unidirectional thrust may be absorbed.

What I claim is:

1. A system for suspending on the fuselage of a rotorcraft the transmission housing of the rotor, said transmission housing being subject to movement about a central axis and in directions radial to the central axis, comprising
   a baseplate fastened to the bottom of the transmission housing to move conjointly therewith, said baseplate having a pair of diametrically opposed radially extending shoulders,
   means independent of said baseplate fixed relatively to the fuselage having radial projections extending in opposition to said shoulders to form an abutment therefor to limit the movement of said baseplate, and
   resilient means interposed between each of said shoulders and said projections to absorb the force of said movement.

2. The system according to claim 1, wherein said baseplate comprises a ring formed of a light metal alloy.

3. The system according to claim 1, wherein said resilient means is secured to one of each of said shoulders and projections.

4. The system according to claim 1, wherein said resilient means comprise an assembly of alternating metal plates and elastic sheets arranged so as to be relatively shiftable with respect to each other.

5. The system according to claim 1, including a rigid ring surrounding said baseplate and being coplanar therewith, said rigid ring having a first pair of diametrically opposed extensions and a second pair of diametrically opposed extensions offset by 90° from said first pair of extensions, each of the first pair of extensions being opposed to one of the shoulders of said baseplate to coact therewith, and each of said second pair of extensions being opposed to one of said projections fixed relatively to said fuselage to coact therewith, and including resilient means interposed respectively between each of said extensions and the associated shoulders and projections.

6. The system according to claim 5, in which said rigid ring comprises two parallel substantially planar and identical annular members having said baseplate positioned therebetween, said extensions being raised between and affixed to said parallel annular members to form therebetween spacers maintaining same in parallel relationship.

7. The suspension system according to claim 1 wherein the rotorcraft is a helicopter.

8. The suspension system according to claim 2 wherein the rotorcraft is a helicopter.

9. The suspension system according to claim 3 wherein the rotorcraft is a helicopter.

* * * * *